(12) United States Patent
Schonhuber et al.

(10) Patent No.: US 7,980,591 B2
(45) Date of Patent: Jul. 19, 2011

(54) GAS BAG MODULE

(75) Inventors: Georg Schonhuber, Oberneukirchen (DE); Ernst Enzmann, Grassau (DE); Hannes Nuiding, Muehldorf am Inn (DE)

(73) Assignee: TRW Airbag Systems GmbH, Achchau am Inn (DE)

( * ) Notice: Subject to any disclaimer, the term of this patent is extended or adjusted under 35 U.S.C. 154(b) by 40 days.

(21) Appl. No.: 12/086,107

(22) PCT Filed: Dec. 8, 2006

(86) PCT No.: PCT/EP2006/011857
§ 371 (c)(1),
(2), (4) Date: Aug. 18, 2009

(87) PCT Pub. No.: WO2007/065709
PCT Pub. Date: Jun. 14, 2007

(65) Prior Publication Data
US 2009/0309342 A1    Dec. 17, 2009

(30) Foreign Application Priority Data
Dec. 8, 2005 (DE) .......................... 10 2005 058 721

(51) Int. Cl.
*B60R 21/26* (2011.01)
(52) U.S. Cl. ........................................... 280/737
(58) Field of Classification Search .................. 280/736, 280/737, 741
See application file for complete search history.

(56) References Cited

U.S. PATENT DOCUMENTS

| | | | |
|---|---|---|---|
| 6,213,502 B1 * | 4/2001 | Ryan et al. | 280/736 |
| 6,439,603 B2 * | 8/2002 | Damman et al. | 280/736 |
| 6,746,044 B2 * | 6/2004 | Elqadah et al. | 280/736 |
| 7,431,336 B2 * | 10/2008 | Karlow et al. | 280/739 |
| 2002/0158456 A1 | 10/2002 | Fischer | |
| 2004/0113406 A1 | 6/2004 | Elqadah et al. | |
| 2005/0057027 A1 | 3/2005 | Fogle, Jr. et al. | |
| 2006/0055159 A1 * | 3/2006 | Fischer et al. | 280/739 |
| 2006/0163855 A1 * | 7/2006 | Szidzek et al. | 280/743.1 |

FOREIGN PATENT DOCUMENTS

DE    197 28 658 A1    1/1999
EP    1 683 690 A1    7/2006

\* cited by examiner

*Primary Examiner* — Paul N Dickson
*Assistant Examiner* — Robert A Coker
(74) *Attorney, Agent, or Firm* — Tarolli, Sundheim, Covell & Tummino LLP

(57) ABSTRACT

The invention relates to a gas bag module (10) for a vehicle safety system, including a gas bag (48), a gas generator (12), a module housing (46), and a pyrotechnical actuator unit (16) which is fitted to a module component by an attachment section (22), the space which is acted upon with an internal pressure upon an activation of the gas generator (12) and is at least partly limited by the gas bag interior being defined as a gas bag chamber (52). After its activation, the actuator unit (16) breaks into the attachment section (22) fixed at the module component and at least one separated fragment (24), the separated fragment (24) being situated outside of the gas bag chamber (52), and a restraint element (30) being provided which limits the freedom of movement of the separated fragment (24).

17 Claims, 10 Drawing Sheets

GAS BAG MODULE

FIELD OF THE INVENTION

The present invention relates to a gas bag module for a vehicle safety system, including a gas bag, a gas generator, a module housing, and a pyrotechnical actuator unit which is fitted to a module component by an attachment section, the space which is acted upon with an internal pressure upon an activation of the gas generator and is at least partly limited by the gas bag interior being defined as a gas bag chamber and, after its activation, the actuator unit breaking into the attachment section fixed at the module component and at least one separated fragment.

BACKGROUND OF THE INVENTION

In modern vehicle safety systems, particularly in gas bag modules, attempts are made to adjust the safety system more and more individually to various parameters of a crash situation. One known and advantageous option here is the use of traction means such as, e.g., tethers which, when released, cause discharge openings to be opened or closed. Furthermore, such traction means can also be used to influence the geometry of the gas bag and/or open up an additional gas bag volume.

A tether release device called TAU (tether activation unit) can be made use of for active release of the traction means. Such a TAU is generally subjected to shearing stresses by a comparatively low transverse force load, which is why it is possible, e.g., to make the TAU from a plastic material or to attach it by a detent connection. Conventional, solid separation bolts made of metal, which are, as a rule, fastened by means of a thread, are often oversized and too expensive for these applications.

SUMMARY OF THE INVENTION

It is the object of the present invention to increase the functional reliability of a gas bag module having a pyrotechnical actuator unit.

The object is achieved according to the invention by a gas bag module of the type initially mentioned, in which the separated fragment is situated outside of the gas bag chamber, and a restraint means being provided which limits the freedom of movement of the separated fragment. The separated fragment can therefore no longer move freely to cover any distance but, depending on the configuration of the restraint means, is restricted to a movement in the vicinity of the attachment section, which prevents damage to the module. It is particularly advantageous that the separated fragment is situated outside of the gas bag chamber because the fragment is further away from an occupant and can be moved or restrained independently of the deployment of the gas bag.

In one embodiment, the restraint means engages a separable section of the actuator unit which, after activation of the actuator unit, forms the separated fragment. In this embodiment, there never occurs a completely freely movable fragment since the separable section of the actuator unit is held by the restraint means even before the activation of the actuator unit.

In this embodiment, the restraint means is preferably an ignition cable of the actuator unit. The ignition cable, which is provided in any case and is necessary for the power supply of the actuator unit, serves at the same time as a restraint means in this case, so that no additional component is required to restrain the fragment.

Where appropriate, a securing member may be provided which secures the connection between the ignition cable and a plug of the ignition cable and/or the connection between the plug and the separable section of the actuator unit against an unintentional release. Since normally these connections are not designed to bear any major mechanical loads, such a securing member constitutes a simple way to increase the maximum load-bearing capacity of the restraint means.

Furthermore, a fixing means may be provided between the plug and a power supply unit for fixing the ignition cable in place. With the aid of such a fixing means, the free cable length of the ignition cable is shortened, so that the radius of possible movement of the separated fragment is reduced.

In another embodiment, the restraint means surrounds a separable section of the actuator unit which after an activation of the actuator unit forms the separated fragment. In this case, the separated fragment can move freely immediately upon its separation from the attachment section, but will abut against the restraint means after a distance that is usually selected to be relatively short, as a result of which the fragment has limited possibilities to move.

After an activation of the actuator unit, the restraint means, together with the attachment section of the actuator unit and a module component, preferably defines a cage for the separated fragment in which the fragment can move freely. Any mechanically load-bearing connection which reliably attaches the separated fragment to the restraint means is not required in this case.

The present invention further encompasses a gas bag module for a vehicle safety system, including a gas bag, a gas generator, a module housing, and a pyrotechnical actuator unit, a traction means being provided which is fixed in place by the pyrotechnical actuator unit before an activation of the actuator unit and is released after an activation of the pyrotechnical actuator unit. Here, the actuator unit includes a traction means retainer which secures the traction means against an unintentional release from the actuator unit after an attachment of the actuator unit to a module component and before the activation of the actuator unit. This concept lowers the probability of a malfunction of the vehicle safety system.

Further advantageous developments of the invention will become apparent from the dependent claims.

BRIEF DESCRIPTION OF THE DRAWINGS

The invention will be described below with reference to preferred embodiments, which are illustrated in the accompanying drawings, in which.

DESCRIPTION OF THE EXAMPLE EMBODIMENTS

Figure 1A:
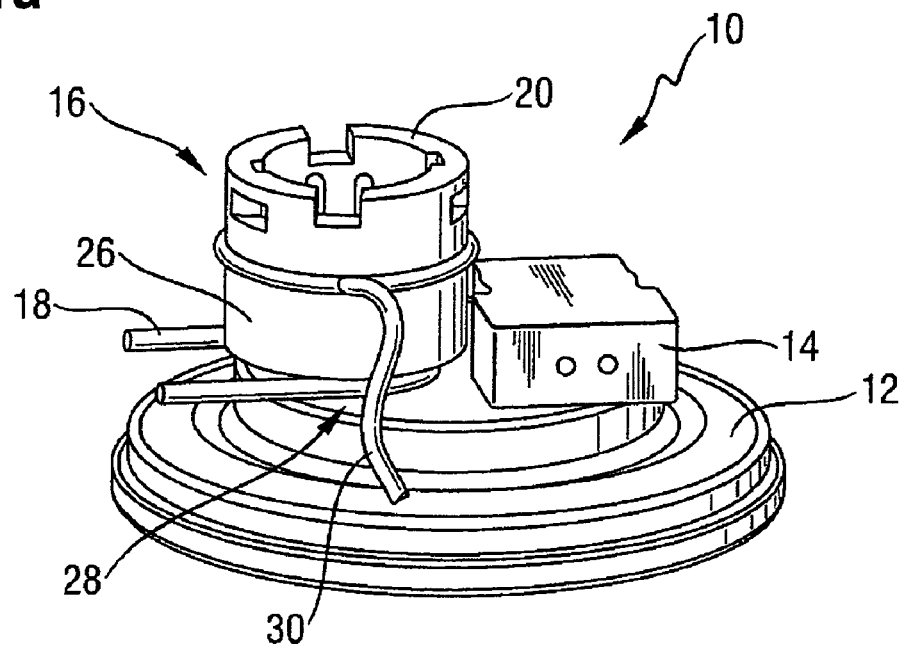
FIGS. 1a and 1b show perspective views of a gas bag module according to a first embodiment of the invention, before and after activation of an actuator unit, respectively.
Figure 1B:
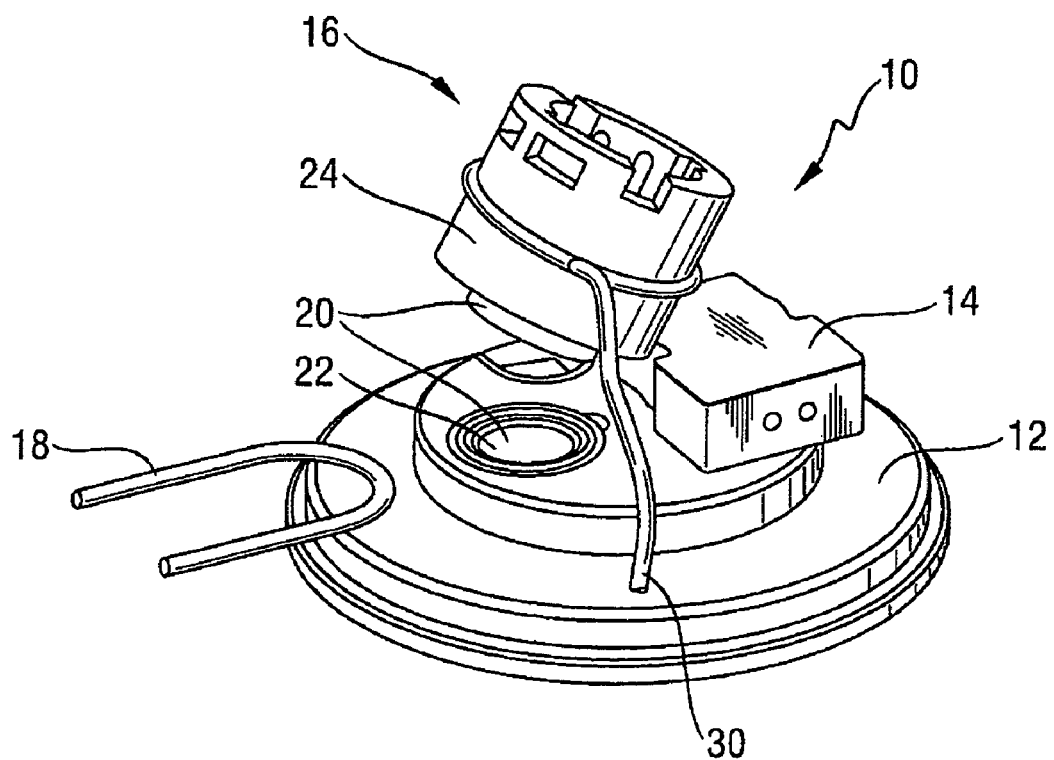

FIGS. 1a and 1b show part of a gas bag module 10, more precisely a view of the lower side of a gas generator 12 of the gas bag module 10. Mounted to the gas generator 12 is an ignition device 14 for a propellant charge which, when activated, provides for gas to flow out of the gas generator 12. Further attached to the gas generator 12 is an actuator unit 16 which, prior to its activation, fixes a traction means 18 in place on the gas generator 12 (FIG. 1a).

The actuator unit 16 includes a pyrotechnical igniter (cf. FIGS. 2 and 8, reference numeral 34) and a housing 20 accommodating the igniter. By an activation of the igniter, the housing 20 breaks into an attachment section 22 and at least one separated fragment 24 (FIG. 1b). Prior to an activation of the actuator unit 16, the actuator unit 16 is firmly connected to the gas generator 12 by means of the attachment section 22; in further design variants, an attachment to other module components (such as, e.g., module housing, gas generator carrier . . . ) is also conceivable. In addition, prior to an activation of the actuator unit 16, the attachment section 22 is firmly, preferably integrally, connected with a separable section 26 which after an activation of the actuator unit 16 forms the separated fragment 24.

In FIG. 1a, the traction means 18 (a cord or a tether, for instance) engages a groove 28, designed as a predetermined breaking point, between the attachment section 22 and the separable section 26. After an activation of the actuator unit 16, the actuator unit 16, more precisely the housing 20 of the actuator unit 16, will tear apart at this predetermined breaking point, releasing the traction means 18 (FIG. 1b). The attachment section 22 remains firmly connected with a generator housing of the gas generator 12, whereas the separated fragment 24 can move freely away from the gas generator 12. In a vehicle safety system, any uncontrolled, free movement of any separated fragments is undesirable, for which reason a restraint means 30 is provided which limits the freedom of movement of the separated fragment 24. In the first embodiment according to FIGS. 1a and 1b, the restraint means 30 is a cord which is looped around the separable section 26 of the actuator unit 16 at a first cord end and is connected with the gas generator 12 at a second cord end. Preferably, a groove or an eye is provided on the separable section 26 to produce a secure connection between the first cord end and the separable section 26 or the fragment 24 separated later, and to prevent the separated fragment 24 from becoming unintentionally detached from the restraint means 30. Alternatively, instead of a cord, it is also possible to use some other flexible and tear-resistant restraint means 30, such as, e.g., a wire. In addition, the second cord end may also be attached to a different module component (e.g., module housing, gas generator carrier . . . ).

Figure 2:
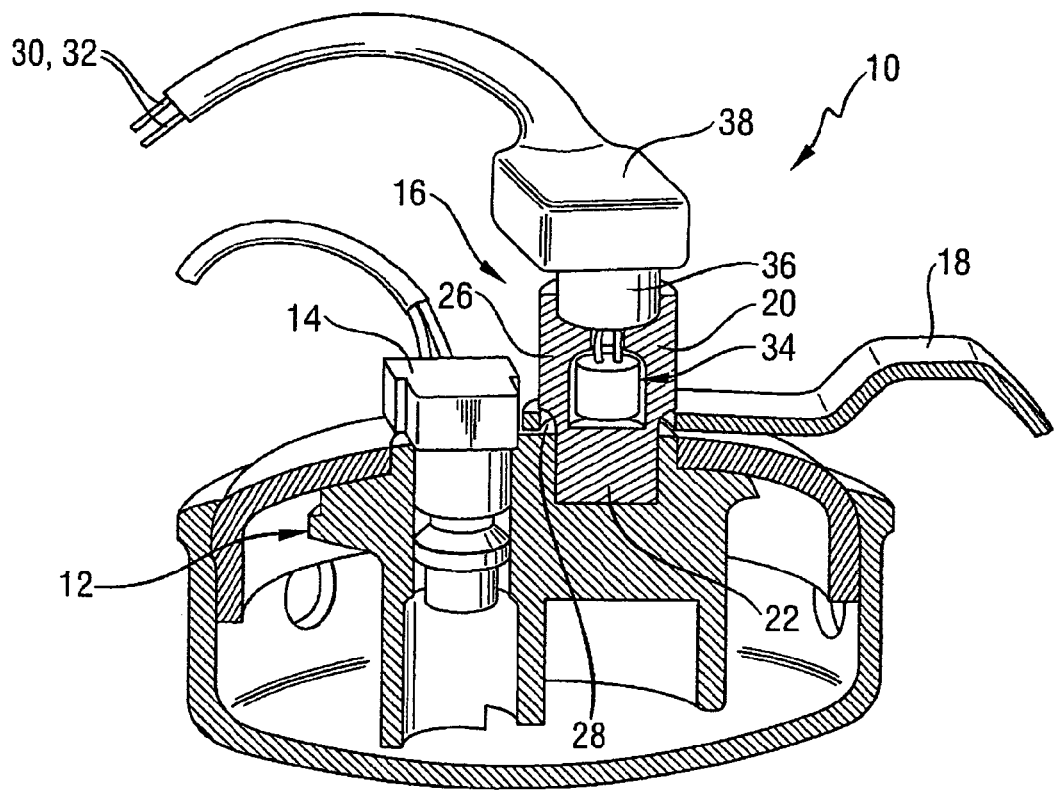
FIG. 2 shows a perspective sectional view of a gas bag module according to a second embodiment of the invention.

FIG. 2 shows a second embodiment of the gas bag module 10, in which the restraint means 30 is an ignition cable 32 of the actuator unit 16. The igniter 34 in the housing 20 of the actuator unit 16 is generally triggered by a current pulse which is provided by a power supply unit (not shown) and transmitted by the ignition cable 32. In embodiments in which the ignition cable 32 engages the separable section 26, it may, in addition to the power supply, also serve as the restraint means 30 for the fragment 24 separated later.

A first end of the ignition cable 32 normally has a plug 36 and is attached to the separable section 26 of the actuator unit 16 by means of a plug connection. The connection between the ignition cable 32 and the plug 36 and/or the plug connection between the plug 36 and the separable section 26 of the actuator unit 16 are, as a rule, designed for a reliable current transfer, but not necessarily for any major mechanical stresses. It may therefore be required to make arrangements for reinforcing these connections or for avoiding any excessive mechanical loading of the connections. In the embodiment according to FIG. 2, provision is therefore made for a securing member 38 which strengthens the connection between the ignition cable 32 and the plug 36. In this case, the securing member 38 is in the form of a sleeve or a heat shrink tube.

Figure 3:
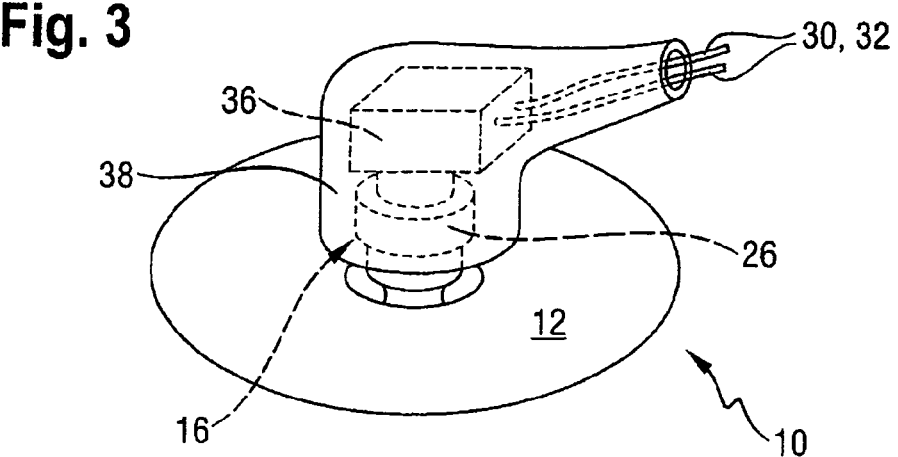
FIG. 3 schematically shows a modified detail of the gas bag module similar to the second embodiment according to FIG. 2.

FIG. 3 shows a variant of the second embodiment according to FIG. 2, in which the components surrounded by the securing member 38 are illustrated in dashed lines. It can be clearly seen here that the securing member 38 extends from the ignition cable 32 over the plug 36 and to the separable section 26 of the actuator unit 16. Compared with FIG. 2, the sleeve or the heat shrink tube in FIG. 3 therefore not only reinforces the connection between the ignition cable 32 and the plug 36, but also the plug connection between the plug 36 and the separable section 26 of the actuator unit 16.

Figure 4:
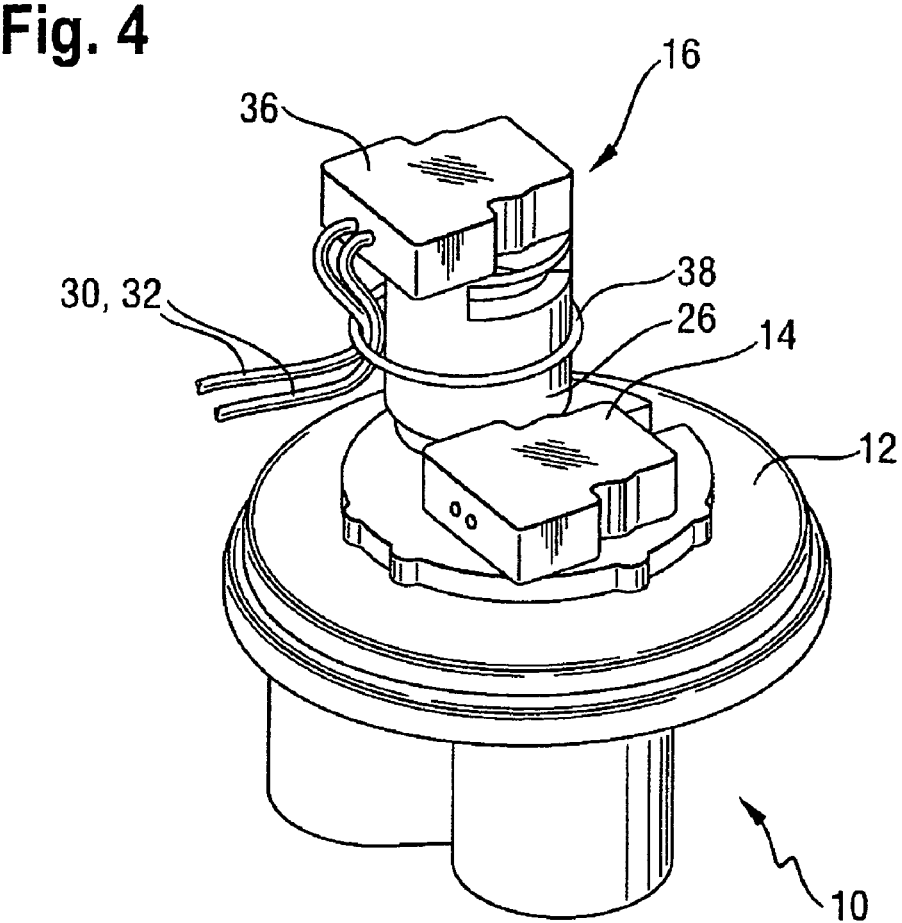
FIG. 4 shows a perspective sectional view of a gas bag module according to a third embodiment of the invention.

FIG. 4 shows a third embodiment of the gas bag module 10, which differs from the second embodiment described above merely in the type of securing member 38. Rather than the previously described sheathing with a heat shrink tube or a sleeve, a cable tie (possibly also a cord, a wire or the like) is preferably used here to form the securing member 38. The cable tie fixes the ignition cable 32 on the separable section 26 of the actuator unit 16, the fixation preferably being so strong that in the area of the cable tie, the ignition cable 32 is unable to execute a movement in relation to the separable section 26 even under a tensile load. This relieves the connection between the ignition cable 32 and the plug 36 and the connection between the plug 36 and the separable section 26—or the separated fragment 24—in a simple manner and reliably prevents the separated fragment 24 from becoming detached from the ignition cable 32.

Figure 5:
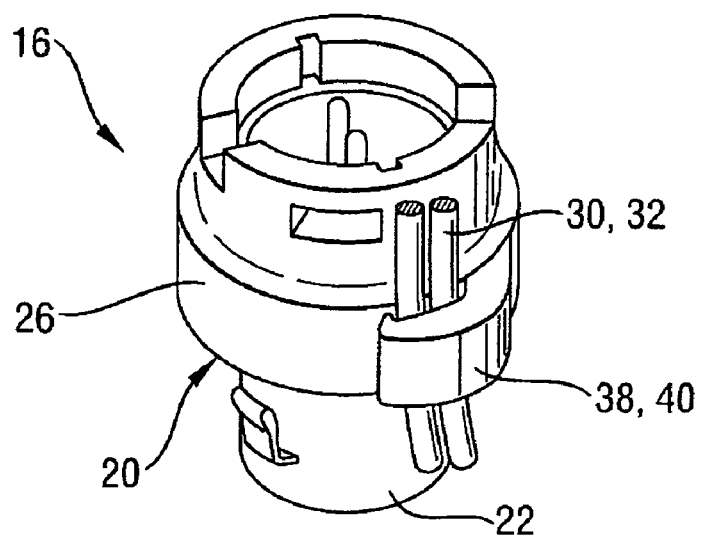
FIG. 5 shows a perspective view of an actuator unit for a gas bag module according to a fourth embodiment of the invention.

The gas bag module 10 according to a fourth embodiment includes an actuator unit 16 according to FIG. 5, which shows a further alternative design of the securing member 38. In this alternative variant, the separable section 26 has an extension 40 to clamp the ignition cable 32 to the housing 20. In this way, the ignition cable 32 is fixed in place in the region of the extension 40 in a similar way as with the cable tie described earlier and thereby relieves the connections between the ignition cable 32 and the plug 36 and between the plug 36 and the separable section 26. Since preferably the entire housing 20, but especially the separable section 26 of the actuator unit 16 is made of a plastic material, the hook-shaped extension 40 may be integrally molded, as illustrated in FIG. 5, requiring little effort.

Figure 6:
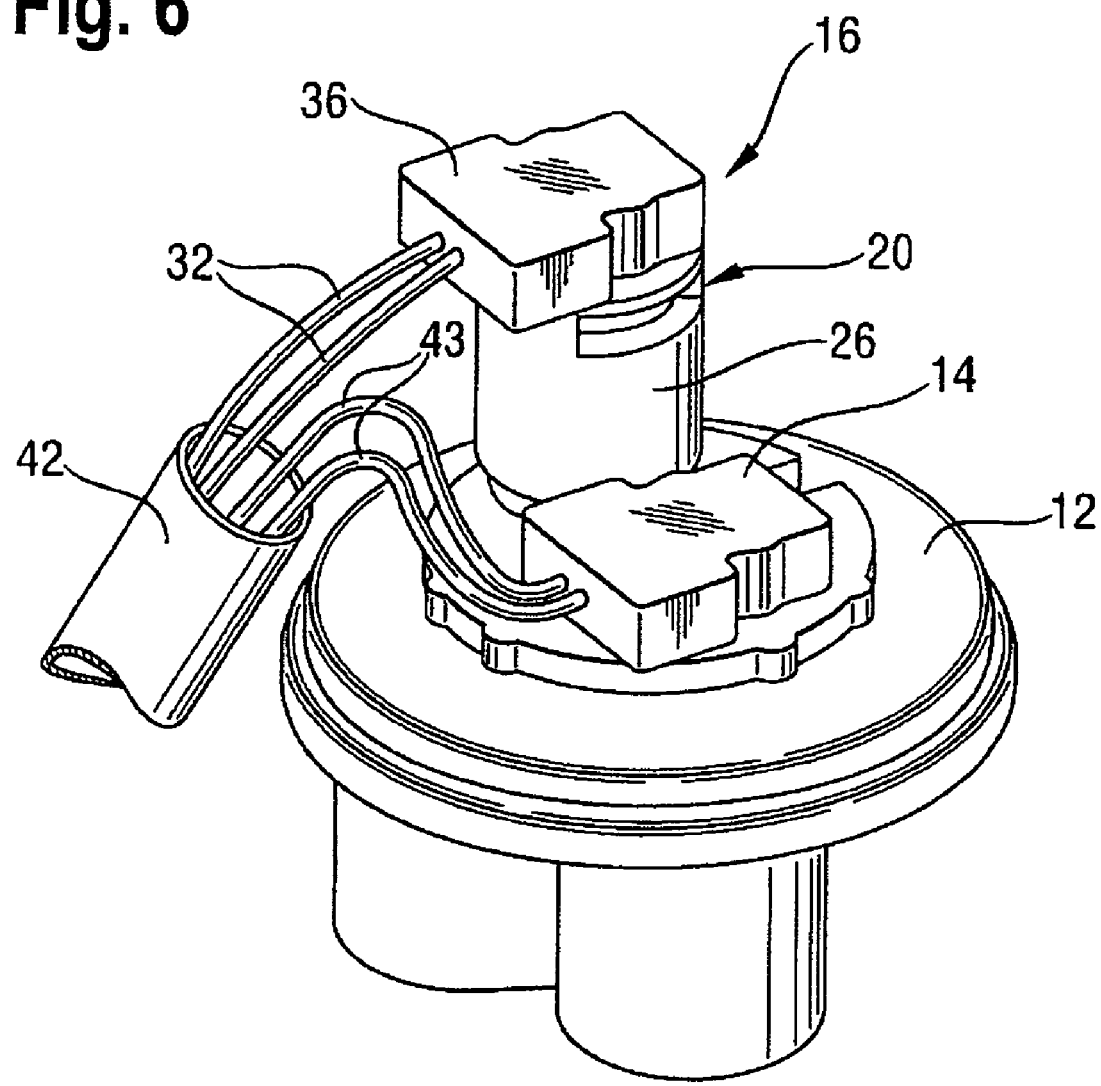
FIG. 6 shows a perspective view of a gas bag module according to a fifth embodiment of the invention.

FIG. 6 shows a fifth embodiment of the gas bag module 10, in which a fixing means 42 for fixing the ignition cable in place is provided between the plug 36 and the power supply unit. Without such a fixing means 42, the radius of movement available to the separated fragment 24 after an activation of the actuator unit 16 would be relatively large and would essentially correspond to the length of the ignition cable 32 between the plug 36 and the power supply unit. In order to keep the radius of movement available to the separated fragment 24 as small as possible, a cable guide is provided to serve as fixing means 42 in FIG. 6, the cable guide combining the ignition cable 32 and other cables 43 of the vehicle safety system to form a cable harness. In the illustrated example, the further cables 43 are likewise ignition cables, which can activate the ignition device 14 of the gas generator 12. Since the further cables 43 are normally not connected to any loose components, but are fixed in position, the cable harness is held by these further cables 43, so that the radius of movement of the separated fragment 24 is essentially reduced to the free length of the ignition cable 32 between the plug 36 and the beginning of the cable guide. Specifically, the cable guide may be configured as a heat shrink tube (FIG. 6) or as a cable tie, for example.

Figure 7:
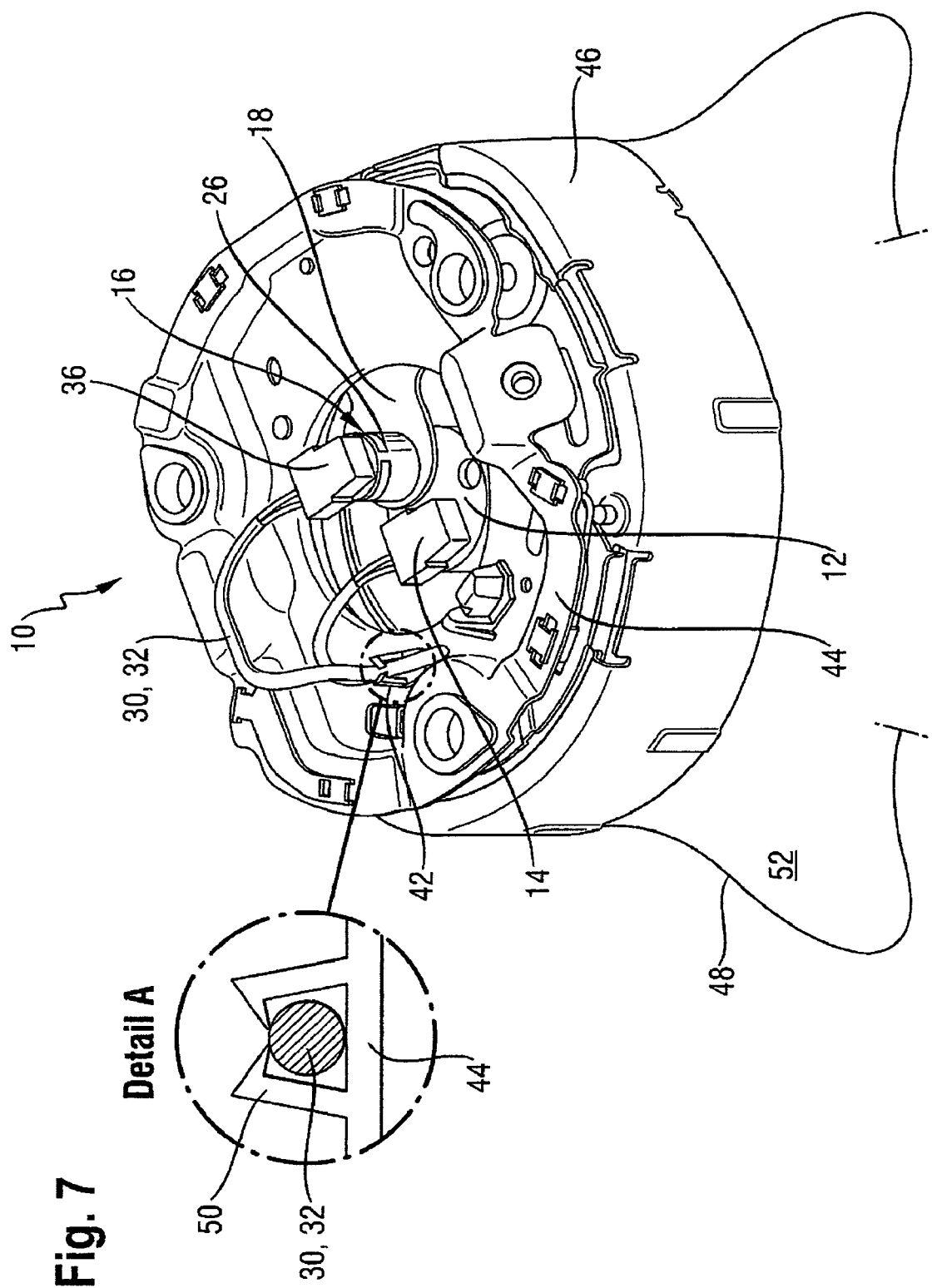
FIG. 7 shows a perspective bottom view of a gas bag module according to a sixth embodiment of the invention.

FIG. 7 shows a complete bottom view of the gas bag module 10 according to a sixth embodiment. In addition to the gas generator 12 already described above, this figure shows further module components, such as a gas generator carrier 44, a module housing 46, and a gas bag 48. A pair of hooks 50 are provided on one of the module components, here on the gas generator carrier 44, to serve as the fixing means 42 for the ignition cable 32. The ignition cable 32 is fixed in place at the gas generator carrier 44 in the vicinity of these hooks 50, so that after an activation of the actuator unit 16, the radius of movement of the separated fragment 24 is reduced to the length of the ignition cable 32 between the plug 36 and the hooks 50. Detail A again illustrates the fixation of the restraint means 30 by the hooks 50 on an enlarged scale.

With reference to FIG. 7, a special advantage of the invention will now be discussed below, which also applies to all of the other embodiments: In all of the gas bag modules 10 described, a gas bag chamber 52 is defined as a space which upon an activation of the gas generator 12 is acted upon with an internal pressure and is at least partly limited by the interior of the gas bag. Depending on the embodiment of the gas bag module 10, in addition to the gas bag 48, other module components such as the gas generator 12 and/or the module housing 46 may also define the gas bag chamber. Since FIG. 7 shows a bottom view of the gas bag module 10, the gas bag chamber 52 extends downward in FIG. 7. Accordingly, the separable section 26 or the later separated fragment 24 is situated outside of the gas bag chamber 52 at all times and, as a result, does not affect the deployment of the gas bag 48. In addition, any damage caused by the separated fragment 24 to, e.g., the gas bag 48 is ruled out. The traction means 18 which is likewise illustrated in FIG. 7 and which is fixed in place by the actuator unit 16, preferably extends through an opening in a module component and into the gas bag chamber 52 and is attached there, for instance to the gas bag 48.

Figure 8:
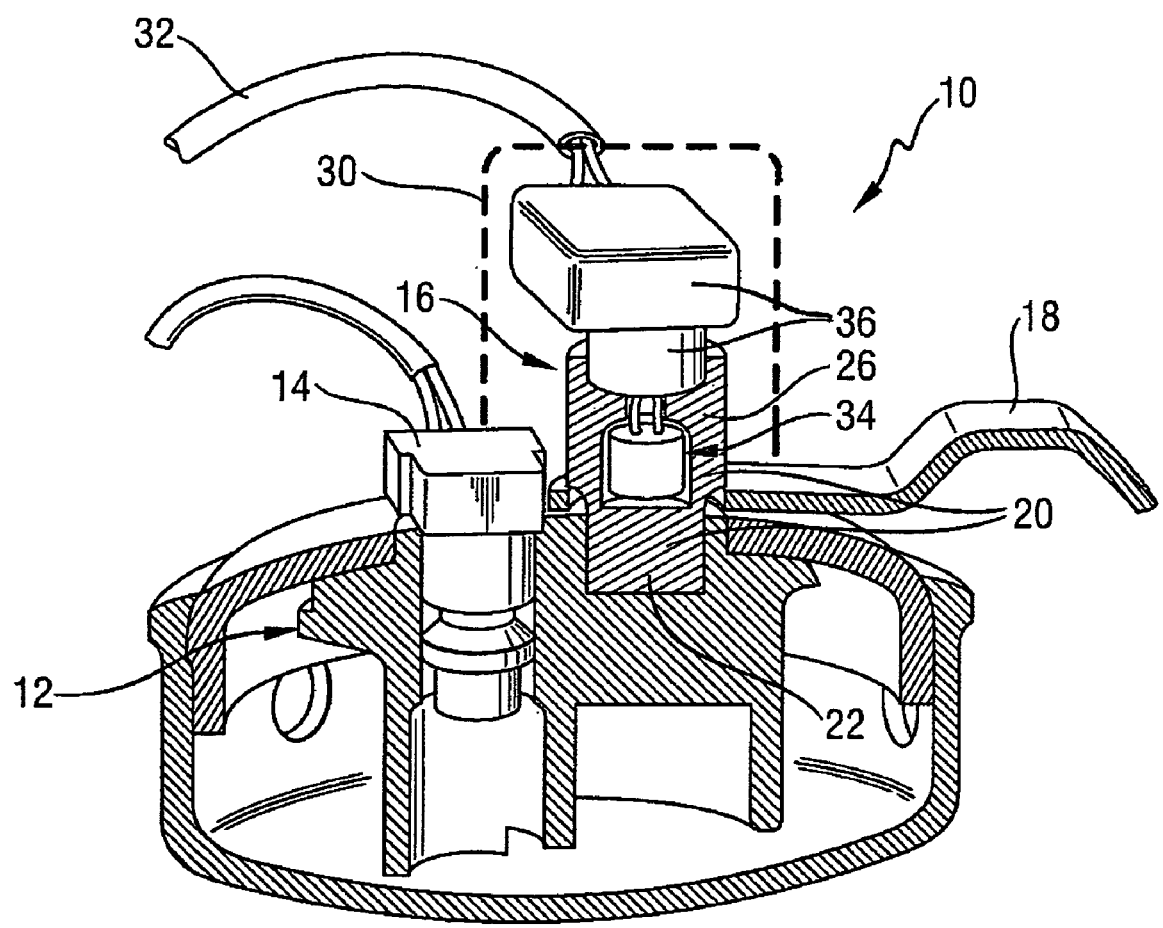
FIG. 8 shows a perspective sectional view of a gas bag module according to a seventh embodiment of the invention.
Figure 9:
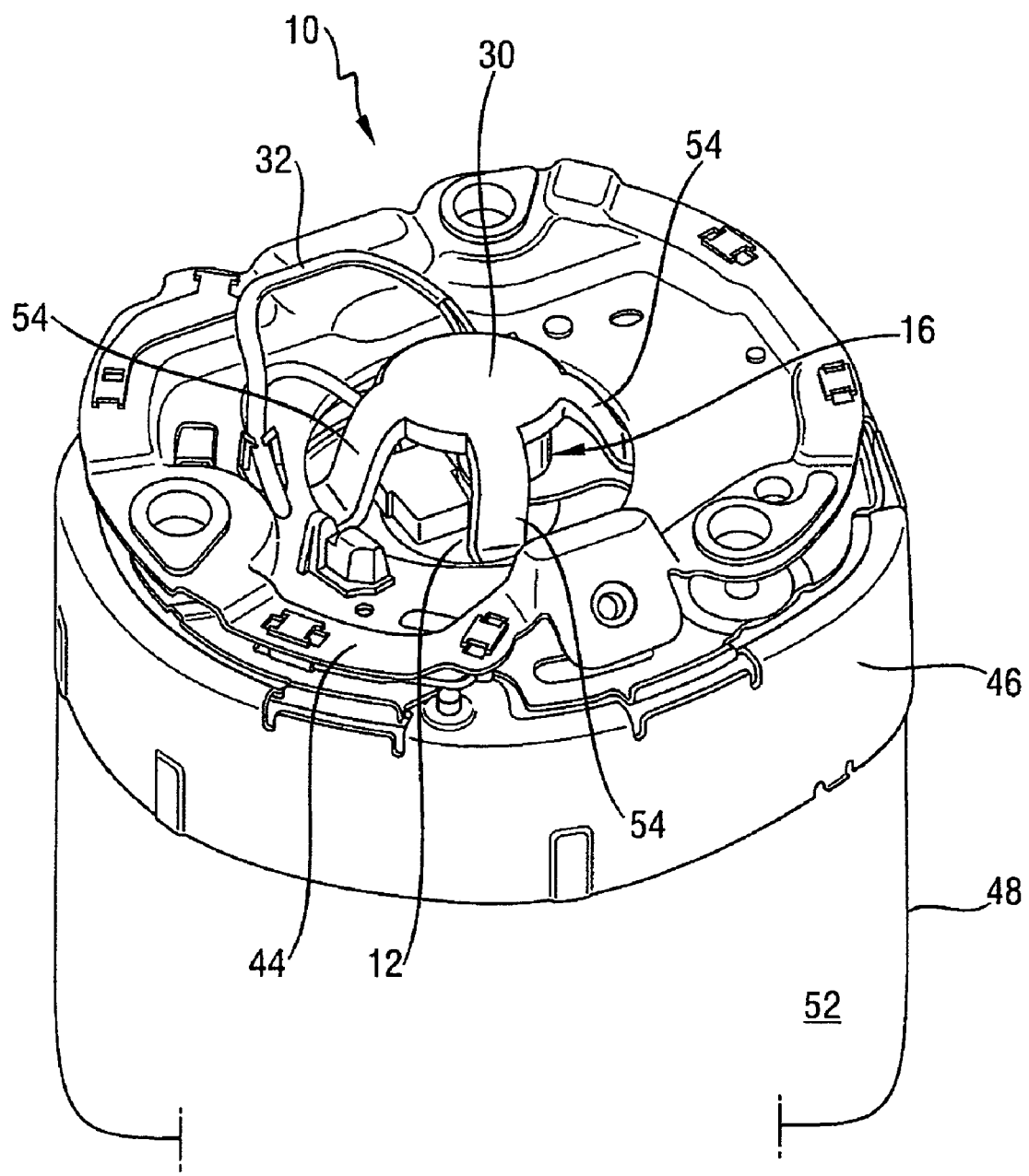
FIG. 9 shows a specific exemplary embodiment of the gas bag module according to FIG. 8 in a perspective bottom view.

FIG. 8 shows a seventh embodiment of the gas bag module 10, in which the restraint means 30 surrounds the separable section 26 or, after the activation of the actuator unit 16, the separated fragment 24. The restraint means 30 is illustrated merely schematically in FIG. 8, whereas FIG. 9 shows a specific exemplary embodiment. In FIG. 9, the restraint means 30 is an arched clip with four elastic feet 54 that are latched in the gas generator carrier 44. Together with one or more module components, it defines a cage for the separated fragment 24 to move freely therein. In this arrangement, any openings that may be provided in the cage are smaller than the separated fragment 24 of the actuator unit 16. In addition, the restraint means 30 should be firmly and reliably attached to the gas generator carrier 44 or some other module component, to prevent the restraint means 30 from becoming detached by an impact of the separated fragment 24.

FIGS. 10a to 10d show an actuator unit 16 and a gas bag module 10 in accordance with an eighth embodiment. A bottom view of the actuator unit (FIG. 10a) shows the attachment section 22 and the separable section 26, with detent hooks 56 being provided on the attachment section 22 for attaching the actuator unit 16 to a module component. The traction means 18 can also be seen, which engages in the region of the later (predefined) breaking point between the attachment section 22 and the separable section 26.

Figure 10A:
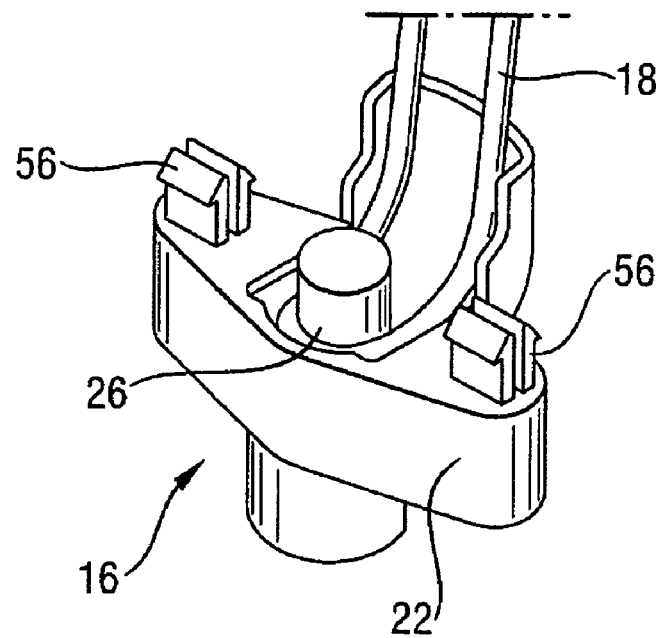
FIGS. 10a to 10d show perspective views of an actuator unit and its being fitted to a gas bag module according to an eighth embodiment of the invention.
Figure 10B:
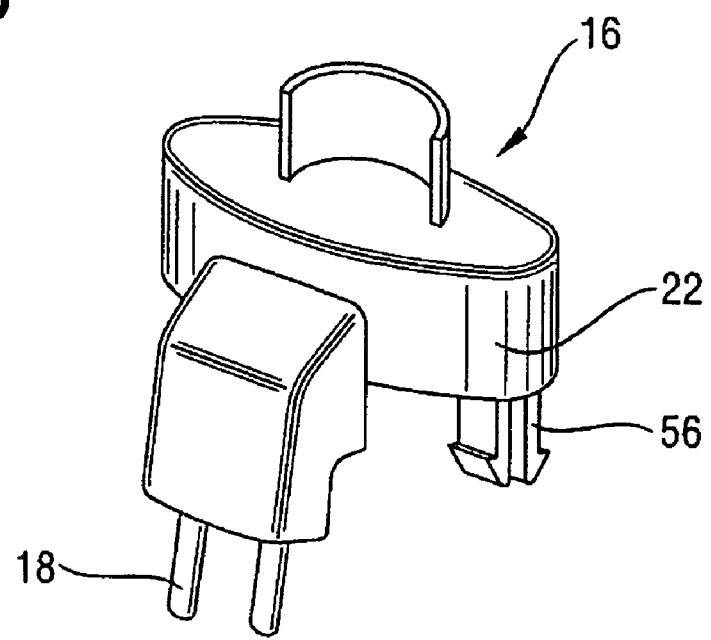

FIG. 10b illustrates the actuator unit 16 and the traction means 18 from FIG. 10a in a top view.

Figure 10C:
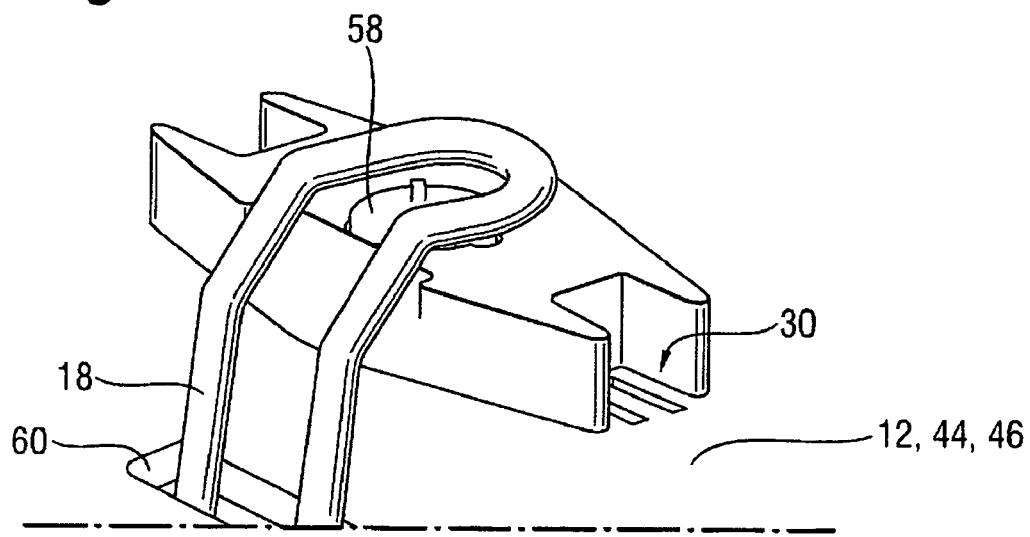

FIG. 10c shows a module housing 46 to which the actuator unit 16 is to be attached. Arranged on the module housing 46 is the restraint means 30 having a recess 58 which, in the installed condition of the actuator unit 16, constitutes the cage for the separated fragment 24. As shown in FIG. 10c, the traction means 18 is led through an opening 60 in the module housing 46 and placed around the recess 58.

Figure 10D:
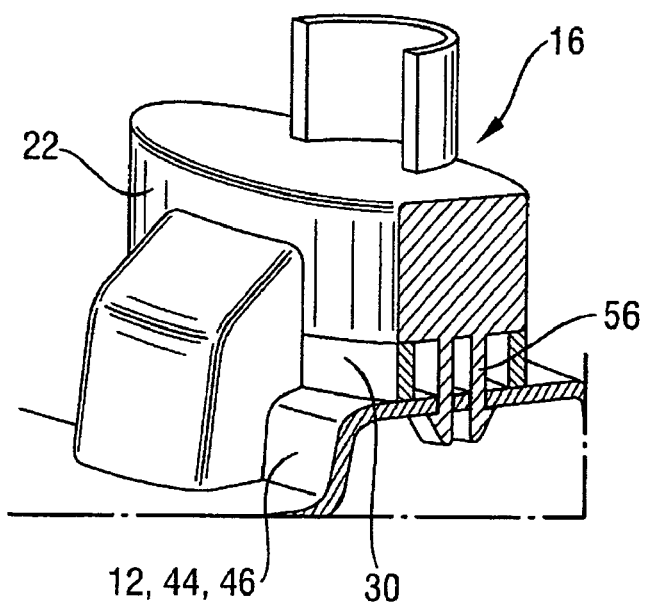

The actuator unit 16 according to FIGS. 10a and 10b is subsequently fitted onto the traction means 18, the restraint means 30, and the module housing 46, so that the detent hooks 56 are latched in the module housing 46 (cf. FIG. 10d). With the components fitted together like this, the separable section 26 of the actuator unit 16 engages into the recess 58 of the restraint means 30 to fix the traction means 18 in the position shown in FIG. 10c. After an activation of the actuator unit 16, the separable section 26 turns into the separated fragment 24 and can move freely in the recess 58. The traction means 18 is released thereby and can move through the opening 60 of the module housing 46 into the interior of the gas bag chamber 52.

As an alternative, the actuator unit 16 may also be attached to other module components such as the gas generator 12 or the gas generator carrier 44, rather than to the module housing 46. In case the module component is not a thin metal sheet, but has a greater material thickness, the restraint means 30 need not be a separate component that is placed on, as illustrated, but may be integrated in the module component. It is furthermore also conceivable that the restraint means 30 is integrated in a component for receiving the gas bag module 10, for instance a steering wheel. After an installation of the gas bag module 10, a recess in the steering wheel defines the cage for the separable section 26 of the actuator unit 16.

Figure 11:
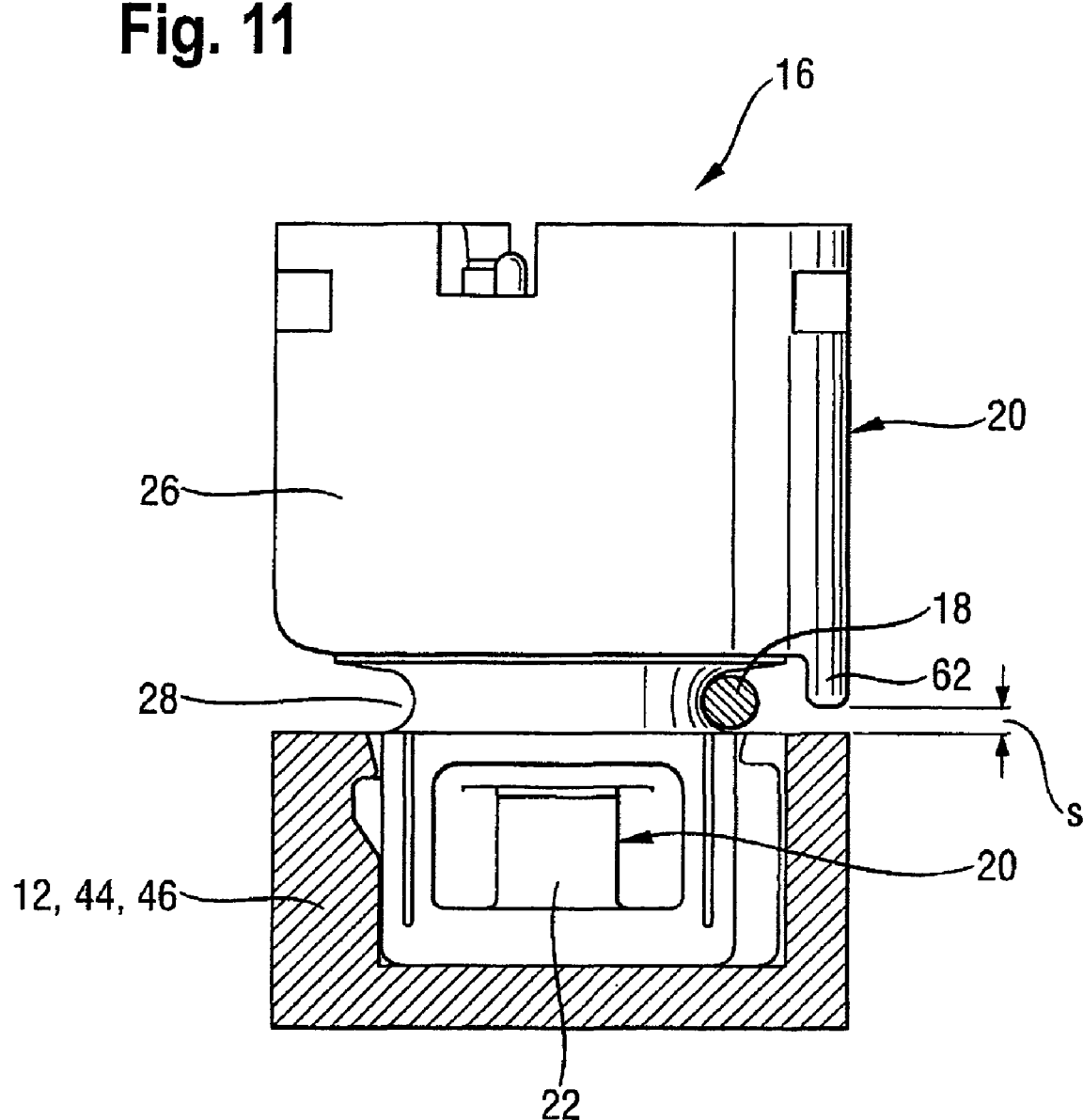
FIG. 11 shows a section taken through an actuator unit of a gas bag module according to a ninth embodiment of the invention.

FIG. 11 shows an actuator unit 16 having a traction means retainer 62, which after an attachment of the actuator unit 16 to a module component and before an activation of the pyrotechnical igniter 34 secures the traction means 18 against an unintentional detachment from the actuator unit 16. In this ninth embodiment of the gas bag module 10 according to FIG. 11, the separable section 26, preferably even the entire housing 20 of the actuator unit 16, is made from a plastic material. The traction means retainer 62 may therefore be configured in the form of an integrally molded housing extension on the separable section 26 at low cost. In this arrangement, the width of a gap s between the respective module component and the traction means retainer 62 in the mounted condition (FIG. 11) is smaller than the diameter of the traction means 18, so that the traction means 18 can not become detached prior to an activation of the pyrotechnical actuator unit 10.

The invention claimed is:
1. A gas bag module for a vehicle safety system, comprising a gas bag (48), a gas generator (12), a module housing (46), and a pyrotechnical actuator unit (16) which is fitted to a module component by an attachment section (22), wherein:

a space which is acted upon with an internal pressure upon an activation of the gas generator (12) and is at least partly limited by the gas bag interior being defined as a gas bag chamber (52), and after activation of the actuator unit (16), the actuator unit (16) breaking into the attachment section (22) fixed at the module component and at least one separated fragment (24), the separated fragment (24) is situated outside of the gas bag chamber (52) such that the separated fragment (24) is prevented from damaging the gas bag (48), a restraint means (30) being provided which limits the freedom of movement of the separated fragment (24).

2. The gas bag module according to claim 1, wherein the pyrotechnical actuator unit (16) includes a pyrotechnical igniter (34) and a housing (20) accommodating the igniter (34), the housing (20) breaking into the attachment section (22) and the at least one separated fragment (24) by an activation of the igniter (34).

3. The gas bag module according to claim 1, wherein the restraint means (30) is attached to a module component.

4. The gas bag module according to claim 1, wherein the restraint means (30) engages a separable section (26) of the actuator unit (16) which, after activation of the actuator unit (16), forms the separated fragment (24).

5. The gas bag module according to claim 4, wherein the restraint means (30) is an ignition cable (32) of the actuator unit (16).

6. The gas bag module according to claim 5, wherein a first end of the ignition cable (32) engages the separable section (26) of the actuator unit (16) by means of a plug (36) and a second end of the ignition cable (32) engages a power supply unit.

7. A gas bag module for a vehicle safety system, comprising a gas bag (48), a gas generator (12), a module housing (46), and a pyrotechnical actuator unit (16) which is fitted to a module component by an attachment section (22), wherein:

a space which is acted upon with an internal pressure upon an activation of the gas generator (12) and is at least partly limited by the gas bag interior being defined as a gas bag chamber (52), and after activation of the actuator unit (16), the actuator unit (16) breaking into the attachment section (22) fixed at the module component and at least one separated fragment (24), the separated fragment (24) being situated outside of the gas bag chamber (52)

a restraint means (30) being provided which limits the freedom of movement of the separated fragment (24), wherein the restraint means (30) engages a separable section (26) of the actuator unit (16) which, after activation of the actuator unit (16), forms the separated fragment (24), wherein the restraint means (30) is an ignition cable (32) of the actuator unit (16), a first end of the ignition cable (32) engaging the separable section (26) of the actuator unit (16) by means of a plug (36), wherein a securing member (38) is provided which secures the connection between the ignition cable (32) and the plug (36) and/or the connection between the plug (36) and the separable section (26) of the actuator unit (16) against an unintentional release.

8. A gas bag module for a vehicle safety system, comprising a gas bag (48), a gas generator (12), a module housing (46), and a pyrotechnical actuator unit (16) which is fitted to a module component by an attachment section (22), wherein:

a space which is acted upon with an internal pressure upon an activation of the gas generator (12) and is at least partly limited by the gas bag interior being defined as a gas bag chamber (52), and after activation of the actuator unit (16), the actuator unit (16) breaking into the attachment section (22) fixed at the module component and at least one separated fragment (24), the separated fragment (24) being situated outside of the gas bag chamber (52)

a restraint means (30) being provided which limits the freedom of movement of the separated fragment (24), wherein the restraint means (30) engages a separable section (26) of the actuator unit (16) which, after activation of the actuator unit (16), forms the separated fragment (24), wherein the restraint means (30) is an ignition cable (32) of the actuator unit (16), a first end of the ignition cable (32) engaging the separable section (26) of the actuator unit (16) by means of a plug (36), wherein a fixing means (42) is provided between the plug (36) and the power supply unit for fixing the ignition cable in place.

9. The gas bag module according to claim 8, wherein the fixing means (42) has a hook (50) provided on a module component.

10. The gas bag module according to claim 8, wherein the fixing means (42) includes a cable guide by which the ignition cable is fixed in place on at least one other cable (43).

11. A gas bag module for a vehicle safety system, comprising a gas bag (48), a gas generator (12), a module housing (46), and a pyrotechnical actuator unit (16) which is fitted to a module component by an attachment section (22), wherein:

a space which is acted upon with an internal pressure upon an activation of the gas generator (12) and is at least partly limited by the gas bag interior being defined as a gas bag chamber (52), and after activation of the actuator unit (16), the actuator unit (16) breaking into the attachment section (22) fixed at the module component and at least one separated fragment (24), the separated fragment (24) being situated outside of the gas bag chamber (52)

a restraint means (30) being provided which limits the freedom of movement of the separated fragment (24), wherein the restraint means (30) engages a separable section (26) of the actuator unit (16) which, after activation of the actuator unit (16), forms the separated fragment (24), wherein the restraint means (30) surrounds a separable section (26) of the actuator unit (16) which after an activation of the actuator unit (16) forms the separated fragment (24).

12. The gas bag module according to claim 11, wherein after an activation of the actuator unit (16), the restraint means (30), the attachment section (22) of the actuator unit (16), and a module component define a cage for the separated fragment (24) in which the fragment (24) can move freely.

13. The gas bag module according to claim 11, wherein the restraint means (30) is latched in a module component.

14. The gas bag module according to claim 11, wherein the restraint means (30) is arranged between the pyrotechnical actuator unit (16) and a module component.

15. The gas bag module according to claim 11, wherein the restraint means (30) is integrated in a module component.

16. A gas bag module for a vehicle safety system, according to claim 1, wherein the gas bag (48), the gas generator (12), the module housing (46), and the pyrotechnical actuator unit (16), a traction means (18) being provided which is held by the pyrotechnical actuator unit (16) before an activation of the actuator unit (16) and is released after an activation of the pyrotechnical actuator unit (16), characterized in that the pyrotechnical actuator unit (16) includes a traction means retainer (62) which secures the traction means (18) against an unintentional release from the actuator unit (16) after an attachment of the actuator unit (16) to a module component and before an activation of the actuator unit (16).

17. The gas bag module according to claim 16, wherein the actuator unit (16) has a housing (20) which is at least partially made of a plastic material, the traction means retainer (62) being an integrally molded housing extension.

* * * * *